US010585647B2

(12) United States Patent
Inoue et al.

(10) Patent No.: US 10,585,647 B2
(45) Date of Patent: Mar. 10, 2020

(54) PROGRAM OPTIMIZATION BY CONVERTING CODE PORTIONS TO DIRECTLY REFERENCE INTERNAL DATA REPRESENTATIONS

(71) Applicant: INTERNATIONAL BUSINESS MACHINES CORPORATION, Armonk, NY (US)

(72) Inventors: Hiroshi Inoue, Tokyo (JP); Kazuaki Ishizaki, Tokyo (JP); Jan M. Wroblewski, Warsaw (PL); Moriyoshi Ohara, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 15/584,432

(22) Filed: May 2, 2017

(65) Prior Publication Data

US 2018/0321916 A1    Nov. 8, 2018

(51) Int. Cl.
G06F 9/44      (2018.01)
G06F 8/30      (2018.01)
G06F 8/52      (2018.01)
G06F 9/455     (2018.01)

(52) U.S. Cl.
CPC ............... *G06F 8/30* (2013.01); *G06F 8/52* (2013.01); *G06F 9/45504* (2013.01)

(58) Field of Classification Search
CPC ........................................................ G06F 8/30
USPC ........................................................ 717/106
See application file for complete search history.

(56) References Cited

U.S. PATENT DOCUMENTS

| | | | | | |
|---|---|---|---|---|---|
| 5,881,291 | A | * | 3/1999 | Piazza | G06F 8/423 717/114 |
| 5,999,737 | A | * | 12/1999 | Srivastava | G06F 8/433 717/146 |
| 6,066,181 | A | * | 5/2000 | DeMaster | G06F 8/30 717/148 |
| 7,146,604 | B2 | * | 12/2006 | Vion-Dury | G06F 8/425 717/120 |
| 7,533,102 | B2 | * | 5/2009 | Kalia | G06F 16/284 |
| 7,747,991 | B2 | * | 6/2010 | Tanaka | G06F 9/449 717/152 |
| 7,825,933 | B1 | * | 11/2010 | Kilgard | G06T 15/005 345/440 |
| 7,873,952 | B2 | * | 1/2011 | Shtilman | G06F 8/443 717/154 |
| 8,065,655 | B1 | * | 11/2011 | Deo | G06F 16/367 717/106 |

(Continued)

OTHER PUBLICATIONS

"Compile-Time Type-Driven Data Representation Transformations in Object-Oriented Languages"; Vlad Ureche—Thesis, École Polytechnique Fédérale De Lausanne, Switzerland—Nov. 30, 2015.*

(Continued)

*Primary Examiner* — Francisco J Aponte
(74) *Attorney, Agent, or Firm* — Tutunjian & Bitetto, P.C.; Vazken Alexanian

(57) ABSTRACT

A method includes identifying a code portion that accesses a primitive value in a user-defined function included in a user program, converting the code portion and an argument in a manner to directly reference an internal data representation of the user program, and generating a code for calling the user-defined function converted by the conversion.

17 Claims, 7 Drawing Sheets

(56) References Cited

U.S. PATENT DOCUMENTS

| | | | | |
|---|---|---|---|---|
| 8,121,976 B2* | 2/2012 | Kalia | G06F 16/284 | 707/601 |
| 8,171,461 B1* | 5/2012 | Kilgard | G06F 8/4441 | 709/232 |
| 8,191,055 B2* | 5/2012 | Ritzau | G06F 9/44557 | 717/151 |
| 8,572,589 B2* | 10/2013 | Cataldo | G06F 8/20 | 717/125 |
| 8,612,951 B2* | 12/2013 | Arnold | G06F 8/71 | 717/140 |
| 8,739,150 B2* | 5/2014 | Gass | G06F 8/72 | 717/168 |
| 8,984,496 B2* | 3/2015 | Devane | G06F 8/41 | 717/136 |
| 9,298,433 B2* | 3/2016 | Adl-Tabatabai | G06F 8/443 | |
| 9,372,881 B1* | 6/2016 | Upton | G06F 16/258 | |
| 9,686,086 B1* | 6/2017 | Nguyen | H04L 12/1822 | |
| 2007/0168951 A1* | 7/2007 | Vollmann | G06F 9/44521 | 717/118 |
| 2009/0077533 A1* | 3/2009 | Hogan | G06F 11/3688 | 717/106 |
| 2009/0083719 A1* | 3/2009 | Hsieh | G06F 8/44 | 717/140 |
| 2009/0125548 A1* | 5/2009 | Moir | G06F 9/52 | |
| 2012/0197921 A1* | 8/2012 | Mineno | G06F 17/30622 | 707/758 |
| 2013/0066924 A1* | 3/2013 | Iyer | G06F 8/51 | 707/802 |
| 2014/0007047 A1* | 1/2014 | Ogasawara | G06F 8/315 | 717/110 |
| 2015/0331681 A1* | 11/2015 | Rose | G06F 8/437 | 717/143 |
| 2016/0062878 A1* | 3/2016 | Westrelin | G06F 9/4552 | 717/130 |
| 2016/0124731 A1* | 5/2016 | Hill, III | G06F 8/47 | 717/137 |
| 2016/0239278 A1* | 8/2016 | Che | G06F 8/4441 | |

OTHER PUBLICATIONS

"RDD Transformation and Action APIs in Apache Spark" (Jul. 26, 2016) pp. 1-19, http://data-flair.training/blogs/rdd-transformations-actions-apis-apache-spark/.

Vallee-Rai, R., "Soot: A Java Bytecode Optimization Framework" Thesis for School of Computer Science, McGill University, Montreal (Oct. 2000) pp. 1-115.

* cited by examiner

```
1  val ds = sparkContext.parallelize(Seq(Array(1.2, 2.2)), 1).toDS().cache
2  ds.count
3  val a = ds.map(array: Array[Double] => {
4    var i = 0
5    var result = 0.0
6    while (i < array.length) {
7      result += array(i)
8      i += 1
9    }
10   result
11 })
12 a.show
```

*FIG. 3*

```
/* 041 */   protected void processNext() throws java.io.IOException {
/* 042 */     while (inputadapter_input.hasNext()) {
/* 043 */       InternalRow inputadapter_row = (InternalRow) inputadapter_input.next();
/* 044 */       boolean inputadapter_isNull = inputadapter_row.isNullAt(0);
/* 045 */       ArrayData inputadapter_value = inputadapter_isNull ? null : (inputadapter_row.getArray(0));
/* 047 */       boolean deserializetoobject_isNull = true;
/* 048 */       double[] deserializetoobject_value = null;
/* 049 */       if (!inputadapter_isNull) {
/* 050 */         deserializetoobject_isNull = false;
/* 051 */         if (!deserializetoobject_isNull) {
/* 052 */           Object deserializetoobject_funcResult = null;
/* 053 */           deserializetoobject_funcResult = inputadapter_value.toDoubleArray();
/* 054 */           if (deserializetoobject_funcResult == null) {
/* 055 */             deserializetoobject_isNull = true;
/* 056 */           } else {
/* 057 */             deserializetoobject_value = (double[]) deserializetoobject_funcResult;
/* 058 */           }
/* 060 */         }
/* 061 */         deserializetoobject_isNull = deserializetoobject_value == null;
/* 062 */       }
/* 064 */       Object mapelements_obj = ((Expression) references[0]).eval(null);
/* 065 */       scala.Function1 mapelements_value1 = (scala.Function1) mapelements_obj;
/* 066 */       boolean mapelements_isNull = true;
/* 067 */       double mapelements_value = -1.0;
/* 068 */       if (!false) {
/* 069 */         mapelements_argValue = deserializetoobject_value;
/* 070 */
/* 071 */         mapelements_isNull = false;
/* 072 */         if (!mapelements_isNull) {
/* 073 */           Object mapelements_funcResult = null;
/* 074 */           mapelements_funcResult = mapelements_value1.apply(mapelements_argValue);
/* 075 */           if (mapelements_funcResult == null) {
/* 076 */             mapelements_isNull = true;
/* 077 */           } else {
/* 078 */             mapelements_value = (Double) mapelements_funcResult;
/* 079 */           }
/* 081 */         }
/* 083 */       }
/* 085 */       serializefromobject_rowWriter.zeroOutNullBytes();
/* 087 */       if (mapelements_isNull) {
/* 088 */         serializefromobject_rowWriter.setNullAt(0);
/* 089 */       } else {
/* 090 */         serializefromobject_rowWriter.write(0, mapelements_value);
/* 091 */       }
/* 092 */       append(serializefromobject_result);
/* 093 */       if (shouldStop()) return;
/* 094 */     }
/* 095 */   }
```

FIG. 4

```
1  val ds = sparkContext.parallelize(Seq(Array(1.2, 2.2)), 1).toDS().cache
2  ds.count
3  val a = ds.map(arrayData: ArrayData =>{
4    var i = 0
5    var result = 0.0
6    while (i < arrayData.numElements){
7      result += arrayData.getDouble(i)
8      i += 1
9    }
10   result
11 })
12 a.show
```

FIG. 5

```
/* 041 */   protected void processNext() throws java.io.IOException {
/* 042 */     while (inputadapter_input.hasNext()) {
/* 043 */       InternalRow inputadapter_row = (InternalRow) inputadapter_input.next();
/* 044 */       boolean inputadapter_isNull = inputadapter_row.isNullAt(0);
/* 045 */       ArrayData inputadapter_value = inputadapter_isNull ? null : (inputadapter_row.getArray(0));
/* 047 */       boolean deserializetoobject_isNull = true;
/* 048 */       double[] deserializetoobject_value = null;
/* 049 */       if (!inputadapter_isNull) {
/* 050 */         deserializetoobject_isNull = false;
/* 051 */         if (!deserializetoobject_isNull) {
/* 052 */           Object deserializetoobject_funcResult = null;
/* 053 */           deserializetoobject_funcResult = inputadapter_value.toDoubleArray();
/* 054 */           if (deserializetoobject_funcResult == null) {
/* 055 */             deserializetoobject_isNull = true;
/* 056 */           } else {
/* 057 */             deserializetoobject_value = (double[]) deserializetoobject_funcResult;
/* 058 */           }
/* 060 */         }
/* 061 */         deserializetoobject_isNull = deserializetoobject_value == null;
/* 062 */       }
/* 064 */       Object mapelements_obj = ((Expression) references[0]).eval(null);
/* 065 */       scala.Function1 mapelements_value1 = (scala.Function1) mapelements_obj;
/* 065 */       TransformedFunction mapelements_value1 = (TransformedFunction) mapelements_obj;
/* 066 */       boolean mapelements_isNull = true;
/* 067 */       double mapelements_value = -1.0;
/* 068 */       if (!false) {
/* 069 */         mapelements_argValue = deserializetoobject_value;
/* 070 */
/* 071 */         mapelements_isNull = false;
/* 072 */         if (!mapelements_isNull) {
/* 073 */           Object mapelements_funcResult = null;
/* 074 */           mapelements_funcResult = mapelements_value1.apply(inputadapter_value);
/* 075 */           if (mapelements_funcResult == null) {
/* 076 */             mapelements_isNull = true;
/* 077 */           } else {
/* 078 */             mapelements_value = (Double) mapelements_funcResult;
/* 079 */           }
/* 081 */         }
/* 083 */       }
/* 085 */       serializefromobject_rowWriter.zeroOutNullBytes();
/* 087 */       if (mapelements_isNull) {
/* 088 */         serializefromobject_rowWriter.setNullAt(0);
/* 089 */       } else {
/* 090 */         serializefromobject_rowWriter.write(0, mapelements_value);
/* 091 */       }
/* 092 */       append(serializefromobject_result);
/* 093 */       if (shouldStop()) return;
/* 094 */     }
/* 095 */   }
```

*FIG. 6*

PROGRAM OPTIMIZATION BY CONVERTING CODE PORTIONS TO DIRECTLY REFERENCE INTERNAL DATA REPRESENTATIONS

BACKGROUND

Technical Field

The present invention relates to a method, a computer readable storage medium, a computer program product, and a computer.

Description of the Related Art

Conventionally, in various programming languages such as Scala, Java®, C++, and Objective C, there are cases where the data representation of a variable or object in a user program differs from the data representation of data secured in a memory region by a platform processing in these languages or by an additionally provided framework or the like of a class library or the like. In such a case, a performance bottleneck can be formed by the data conversion, as shown in Non-Patent Documents 1 and 2, for example.

Non-Patent Document 1: RDD TRANSFORMATIONS AND ACTIONS IN APACHE SPARK, Jul. 26, 2016.
Non-Patent Document 2: RaJavall'ee-Rai, SOOT: A Java® BYTECODE OPTIMIZATION FRAMEWORK.

SUMMARY

According to an embodiment of the present invention, a method includes identifying a code portion that accesses a primitive value in a user-defined function included in a user program, converting the code portion and an argument in a manner to directly reference an internal data representation of the user program, and generating a code for calling the user-defined function converted by the conversion.

According to an embodiment of the present invention, a computer readable storage medium collectively storing program instructions that are executable by a computer to cause the computer to perform operations including identifying a code portion that accesses a primitive value in a user-defined function included in a user program, converting the code portion and an argument in a manner to directly reference an internal data representation of the user program, and generating a code for calling the user-defined function converted by the conversion.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 3 shows an exemplary user program, in accordance with an embodiment of the present invention;
FIG. 4 shows an exemplary Java® code generated for the map method of FIG. 3 by an apparatus of a comparative example in accordance with an embodiment of the present invention;
FIG. 5 shows a program in a case where the conversion is performed on the user program of FIG. 3 in accordance with an embodiment of the present invention;
FIG. 6 shows an exemplary calling code generated by generation based on the user program of FIG. 3 in accordance with an embodiment of the present invention.

DETAILED DESCRIPTION

Hereinafter, some embodiments of the present invention will be described. The embodiments do not limit the invention according to the claims, and all the combinations of the features described in the embodiments are not necessarily essential to means provided by the embodiments of the present invention.

Figure 1:
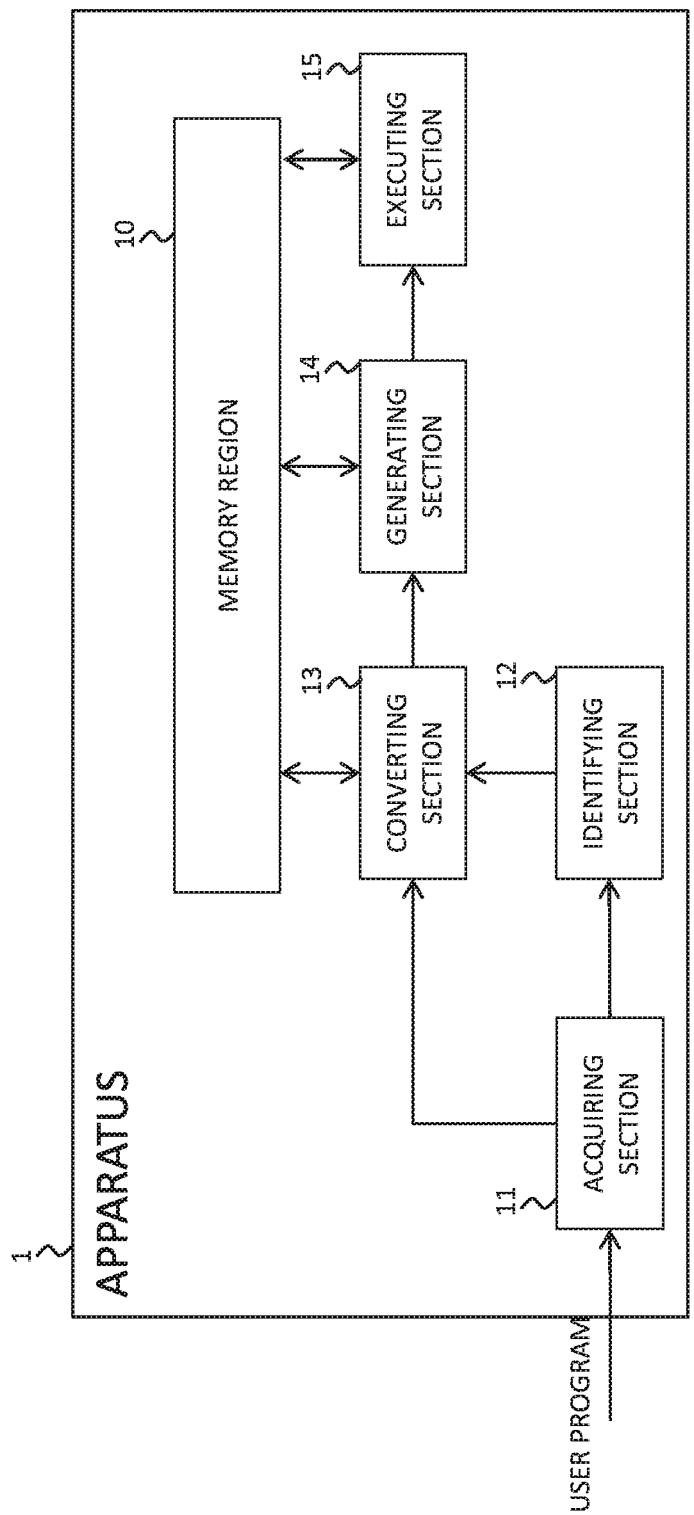
FIG. 1 shows an apparatus according to an embodiment of the present invention.

FIG. 1 shows an apparatus 1 according to the present embodiment. The apparatus 1 may be an information processing apparatus, such as a personal computer (PC), a client computer or server computer, a tablet terminal, such as a smartphone or the like, and may be a distributed system realized by performing distributed processing among a plurality of information processing apparatuses. For example, a Java® virtual machine that is a Java® language platform may be implemented in the apparatus 1, and Apache Spark™ that is a distributed computing framework programmed with Java® bytecode may be implemented in the Java® virtual machine.

A user program executed by the apparatus 1 is written in a programming language, such as Scala language or Java® language, for example, and includes code portions that access primitive values associated with variables, objects, or the like by referencing these variables or objects designated in the user program.

Here, depending on the framework, such as the distributed computing framework called Apache Spark™, and/or the platform, such as the virtual machine processing, the programming language (referred to collectively as "the framework and the like"), there are cases where a storage region, such as a memory space, is secured and used in the framework and the like separately from the variables, objects, and the like defined in the user program.

Furthermore, there are cases where such a framework and the like provides an Application Program Interference (API), such as a method enabling user-defined functions such as functions including lambda expressions using data values in the storage region secured in the framework and the like by providing the user-defined functions as arguments or the like. Such user-defined functions are written with the variables or objects designated in a user program as arguments, and these arguments must originally reference the data representation stored in the storage region secured in the framework and the like in the API of the framework and the like.

Although described below in greater detail, concerning the Dataset format ds in Apache Spark™, for example, if the user-defined function is written in a map method call, such as in "ds.map(array: Array [Double]=> { . . . result+=array(i) . . . })", the user-defined function in the ( ) parentheses with the array defined as an array of variables in a double format (floating point decimals of double precision) in the user program set as the argument is to reference a data value in the memory region secured internally in the map method having a Dataset format. Here, in order to reference the data in the memory region secured internally in Apache Spark™ as the variable in the user program, there is an idea to convert the data in this memory region into a variable in the user program at first, but this requires copying the data value by converting the data in the memory region into a data structure of "array", which is a newly prepared array, and this lowers the performance.

Therefore, the apparatus 1 converts the user-defined function such that the arguments and the code portion accessing primitive values such as elements of the array in the user-defined function directly references the internal data representation of the user program secured by the framework and the like described above, and calls the converted user-defined function instead of calling the original user-defined function.

The apparatus 1 may include a memory region 10, an acquiring section 11, an identifying section 12, a converting section 13, a generating section 14, and an executing section 15.

The memory region 10 is a region included in a primary storage apparatus. Variables and other objects used in the platform for processing the programming language or the framework and the like, such as a class library that is additionally used, may be stored in an in-memory database or the like. The content of the database may be different in other apparatuses.

The acquiring section 11 acquires the user program created by the user. Here, the user program may be written in an object-oriented language. The user program may be a program in which the internal data representation of variables or objects differ from the internal data representation of data secured in the memory region by the platform or by the framework and the like, such as the class library that is additionally used. Here, a data representation may be an expression indicating a storage structure or storage format of data. The internal data representation of the user program may be a data representation unique to the user program, and may be a data representation of the storage region secured by the framework and the like, such as Apache Spark™ in the user program, for example. The user program may be a program for Apache Spark™ written in the Scala or Java® language, and its data representation may be different from the data representation used in the memory space secured for Apache Spark™, e.g., the Java® heap, by the Java® virtual machine that is the platform. The user program may include a user-defined function that is defined by the creator of the user program. The user-defined function may include a lambda expression, for example.

The acquiring section 11 may acquire a source code program or a bytecode program resulting from a bytecode conversion of the source code program, as the user program. Bytecode may be code in an executable format written by command code designed for a virtual machine implemented by software, and may be code acquired by compiling a source code program. The acquiring section 11 may supply the identifying section 12 and the converting section 13 with the acquired program.

The identifying section 12 identifies one or more code portions accessing primitive values by referencing variables, objects, or the like designated in the user-defined function in the program supplied from the acquiring section 11. The identifying section 12 may supply the converting section 13 with identification information of the identified code portion. Here, the primitive values may be arrays or values in a primitive format, such as integer, float, and double, and may be stored in the memory region 10 in an immutable mode, whereby the state thereof is unchangeable after generation.

The converting section 13 converts one or more code portions identified by the identifying section 12 and the arguments thereof, among the programs supplied from the acquiring section 11, in a manner to directly reference the internal data representation of the user program. The converting section 13 may supply the generating section 14 with a program including the converted code and arguments.

The generating section 14 may generate a code (referred to as a calling code) for calling the converted user-defined function resulting from the conversion. The calling code may call the user-defined function and also provide a pointer that references the internal data representation of the arguments in the user program for the called user-defined function. The generating section 14 may supply the executing section 15 with the generated calling code. The generating section 14 may also supply the executing section 15 with the program supplied from the converting section 13.

The executing section 15 executes the user program. The executing section 15 may call the program converted by the converting section 13 using the calling code generated by the generating section 14, while executing the user program, and execute this converted program.

With the apparatus 1 described above, the identifying section 12 identifies one or more code portions that access primitive values in the user-defined function in the user program, and the converting section 13 converts these one or more code portions and arguments thereof in a manner to directly reference the internal data representation of the user program. Accordingly, if the original data representation of the user program and the data representation of the memory space of the framework and the like are different while the internal data representation of the user program and the data representation of the memory space are the same, it is possible to execute the program without converting the data in the memory space into the data in the user program. Therefore, it is possible to increase the execution speed of the user program.

Figure 2:
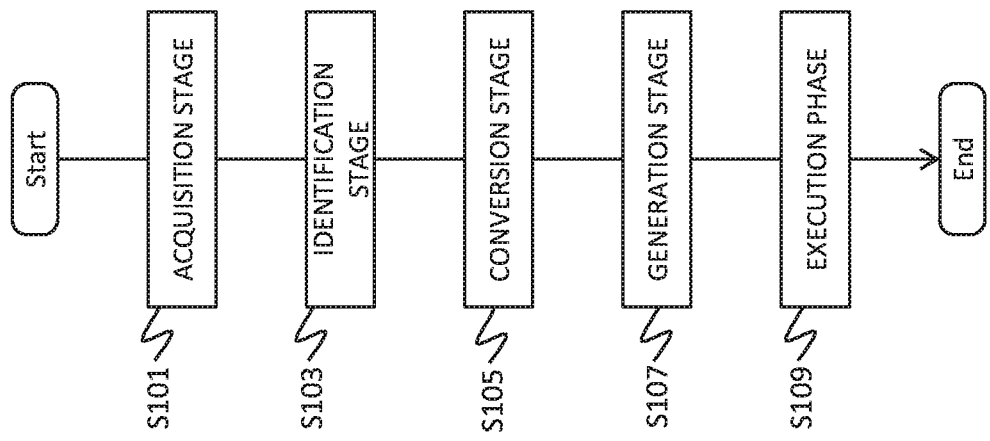
FIG. 2 shows a method according to an embodiment of the present invention.

FIG. 2 shows a method according to an embodiment of the present invention. By performing S101 to S109, the apparatus 1 executes user program compilation or JIT compilation.

First, at S101, the acquiring section 11 may acquire the user program. Here, the user program may include a user-defined function that receives arguments in a method call of an object managing the internal data representation. The object managing the internal data representation may be included in an in-memory computation framework, and may be a Dataset object in Apache Spark™, for example. The arguments may have a simple format, an array format, or another arbitrary format, and may include a plurality of arguments for the user-defined function.

The acquiring section 11 acquires a source code or bytecode program, as the user program. For example, the acquiring section 11 may generate the bytecode program by compiling each code portion that is Scala language and Java® language in the user program that is Scala language and Java® language into a Java® bytecode. Alternatively, the acquiring section 11 may acquire a bytecode program itself directly. In the present embodiment, as an example, the acquiring section 11 ultimately acquires a bytecode program of the user program.

Next, at S103, the identifying section 12 identifies one or more code portions that access primitive values in the user-defined function included in the user program. For example, the identifying section 12 may identify one or more code portions in the user-defined function included in a method call of an object managing the internal data representation.

The identifying section 12 may identify one or more code portions that access primitive values in the program supplied from the acquiring section 11. In the present invention, as an example, the identifying section 12 may identify one or more code portions in the bytecode program. Here, the Java® bytecode that accesses the primitive values may be getfield, baload, caload, saload, iaload, laload, faload, daload, and the like, for example.

Next, at S105, the converting section 13 converts the identified one or more code portions and the arguments thereof, in a manner to directly reference the internal data representation of the user program. Converting the identified one or more code portions and the arguments thereof in a manner to directly reference the internal data representation of the user program may be converting the one or more code portions identified at S103 and the arguments thereof in a manner to reference the internal data representation of the user program secured by the API of the framework and the like, instead of the data representation designated in the user program. For example, if the user program is a program for Apache Spark™, the one or more code portions may be converted to directly reference the internal data representation (e.g., the internal data representation encoded with Scala language) of the program for Apache Spark™.

The converting section 13 may replace the identified one or more code portions with a code sequence for accessing data from the internal data representation of the user program. For example, the converting section 13 may replace the code accessing the variables or objects in Apache Spark™ as the converted code.

The converting section 13 may replace the argument with a pointer to the internal data representation of the user program. For example, if the argument is an array, the converting section 13 may replace the argument with a pointer indicating an address of the memory region at which each element value of this array is lined up in association with the object managing the internal data representation.

The converting section 13 may convert the one or more code portions and the arguments thereof within the program including these one or more code portions identified at S103. For example, the converting section 13 may convert one or more code portions and the arguments thereof in the bytecode program.

Next, at S107, the generating section 14 may generate the calling code of the user-defined function that was converted at S105. The generating section 14 may generate the calling code of a source code label that can be interpreted in a programming language. The generating section 14 may include a call command for obtaining a pointer to the internal data representation of the user program and a call command for calling the converted user-defined function using this pointer, in the generated calling code.

Next, at S109, the executing section 15 executes the user program. For example, by executing the calling code generated at S107 when executing the user-defined function in the user program, the executing section 15 may execute the calling of the user-defined function converted at S105. The executing section 15 may then continue executing the processing after the user-defined function.

In the present embodiment, as an example, if the identifying section 12 does not identify a code portion accessing primitive values in the user-defined function, the executing section 15 may execute the user program acquired by the acquiring section 11 as-is. If the identifying section 12 has identified a code portion, the executing section 15 may execute the calling of the user-defined function converted in S105 by executing the calling code generated in S107. If no argument is present in the memory region 10 (e.g., if the argument has not been cached), the executing section 15 may execute the original user program as-is, without the code conversion by the converting section 13 and the calling code generation by the generating section 14 being performed.

With the method described above, the argument is replaced with the pointer to the internal data representation of the user program, and therefore the handover of the argument to the bytecode program can be simplified.

If the object managing the internal data representation of the user program is included in the in-memory computation framework, the data representation can be directly referenced in the memory without being converted into the variables and objects in the programming language, and therefore the speed of the processing can be increased.

Furthermore, since the argument is replaced with the pointer indicating the address of the memory region where each element value of the array is lined up in association with the object managing the internal data representation, the access to the array can be made faster.

If the user program is executed with a just-in-time (JIT) compilation, the apparatus 1 may save the converted code of the user-defined function and the generated calling code, and use these codes when executing the user program again. In this case, the processes from S103 to S107 can be omitted during the second and following executions.

FIG. 3 shows an exemplary user program. This user program may be a program written in Java® and Scala for Apache Spark™. This program may acquire the sum of the array in a portion of the function (see lines 3 to 11) indicated by the bold characters in the drawing.

In this program, as shown in lines 3 to 11, the map method of the object ds is performed on the result obtained by performing the function with an array having a double format as the argument, and the result of this is set as the variable "a". In the map method, the data format may be converted. Then, as shown in line 12, the data content of the variable "a" is shown.

Here, this user program is converted into a Java® bytecode and executed by a Java® virtual machine. The map method in the third line is a code in Scala language, and therefore, if this code is executed, the calling code of the map method is generated in Java® language at first, and this calling code is then compiled into a Java® bytecode and executed. In this example, the object of the double-format array is set as the argument of the function.

When the bytecode of such a program is acquired by the acquiring section 11, at S103 described above, the identifying section 12 may identify the Java® bytecode portions of "array: Array [Double]", "array.length", and "array(i)" accessing the primitive-type array, in the function. These Java® bytecode portions include the Java® bytecode of "arraylength" and "daload".

FIG. 4 shows an exemplary calling code generated in Java® language for calling the map method of FIG. 3 by an apparatus of a comparative example for the present embodiment. In this drawing, the portion relating to the method of FIG. 2 is indicated by the bold characters.

Here, in line 45, the array in the first column of the Dataset is called, and the array-data-format object "inputadapter_value" is set corresponding to this array.

In line 53, the array-data-format object "inputadapter_value" is converted to a double-format array, and set to "deserializetoobject_funcResult." In this way, the array-data-format object "inputadapter_value" is data-converted into an object for Java® virtual machine.

In line 57, "deserializetoobject_funcResult" is format-converted to the double format, and set to "deserializetoobject_value."

In line 69, "deserializetoobject_value" is set to "mapelements_argValue."

On the other hand, in lines 64 and 65, the object ID of the bytecode generated from the function of FIG. 3 is set to the object "mapelements_obj." Next, "mapelements_obj" is format-converted to Scala function format 1, and set to "mapelements_value1."

Then, in line 74, an apply method is performed on "mapelements_value1" generated in line 65, with "mapelements_argValue" as the argument. The apply method launches the function for map ( ) in FIG. 3. In this way, the array converted to the double format in line 53 is used as the array of FIG. 3.

FIG. 5 shows a program in a case where the conversion of S103 is performed on the user program of FIG. 3. In FIG. 5, the portion relating to the method of FIG. 2 is indicated by bold characters, and the differences with respect to FIG. 3 are underlined. The conversion of S103 may be performed on the bytecode of the user program, and the program of FIG. 5 is obtained by expressing the bytecode in which the conversion of S103 was performed, in a format of the source program for convenience.

In this program, the code portions of "array: Array [Double]", "array.length", and "array(i)" identified at S103 for the program shown in FIG. 3 and the arguments thereof are converted by the converting section 13 at S105. For example, in the source code of FIG. 3, "array.length" and "array(i)", which are source code portions corresponding to the Java® bytecode "arraylength" and "daload" accessing the primitive-type array of the programming language, are respectively converted into "arrayData.numElements" and "arrayData.getDouble(i)" in a manner to directly reference the internal data representation of the Apache Spark™ program. Here, arrayData is the pointer indicating the address of the memory region for the Dataset object of Apache Spark™. The argument of the function is converted from the double-format array "array: Array [Double]" into the array data "arrayData: ArrayData", which is an internal data representation of the Apache Spark™ program.

FIG. 6 shows an exemplary calling code generated by the generating section 14 in S105, based on the user program of FIG. 3. In FIG. 6, the differences with respect to FIG. 3 are underlined.

This program calls a function that has been converted as shown in lines 3 to 11 of FIG. 5. For example, in this program, as shown in line 45, due to the call command "inputadapter_row.getArray(0)", the pointer "inputadapter_value" to the internal data representation in the Dataset object of Apache Spark™ is obtained. Then, as shown in line 74, due to the call command of the apply method, the converted function of FIG. 5 is called using this pointer.

In the embodiment described above, the identifying section 12 identifies the code portions accessing primitive values in the bytecode program, but may instead identify these code portions in the source code program. In this case, the converting section 13 may convert the identified one or more code portions in the source code program.

Furthermore, in the above description, after the code portion identified by the identifying section 12 in the user-defined function has been converted by the converting section 13 in a manner to directly reference the internal data representation of the user program, the generating section 14 generates the calling code for calling the converted user-defined function. However, after the code portion has been identified by the identifying section 12, the generation of the calling code by the generating section 14 can be executed independently from the conversion by the converting section 13, and therefore the conversion by the converting section 13 and the generation by the generating section 14 may be executed in the opposite order or executed simultaneously.

Figure 7:
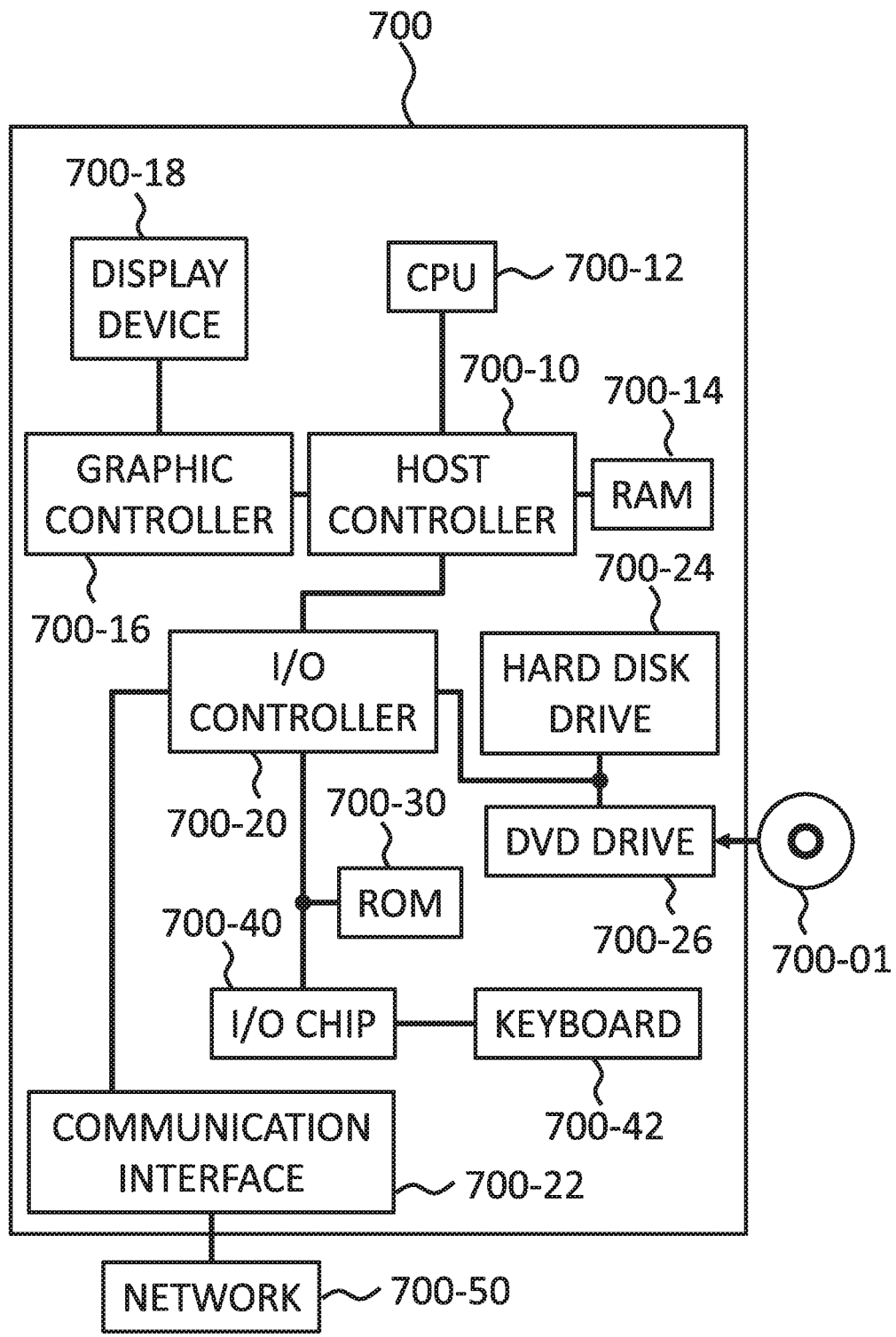
FIG. 7 shows an exemplary hardware configuration of a computer in accordance with an embodiment of the present invention.

FIG. 7 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media, such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700.

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, with the embodiments of the present invention, it is possible to increase the execution speed of the user program.

What is claimed is:

1. A method comprising:
    identifying a code portion that accesses a primitive value in a user-defined function included in a user program by referencing data structures designated in the user-defined function, the user-defined function including an array as an argument;
    converting the code portion and the argument to directly reference an internal data representation; and
    generating a code for calling the user-defined function converted by the conversion, the code including a pointer indicating an address of a memory region directly accessing the primitive value where each element of the array is lined up in association with an object managing the internal data representation.

2. The method according to claim 1, wherein converting includes:
    replacing the code portion with a code sequence for accessing data from the internal data representation; and
    replacing the argument with a pointer to the internal data representation.

3. The method according to claim 2, wherein:
    the user program includes the user-defined function that receives the argument in a method call of the object; and
    identifying includes identifying the code portion in the user-defined function included in the method call of the object.

4. The method according to claim 3, wherein the object is included in an in-memory computation framework.

5. The method according to claim 1, wherein generating includes generating a call command for obtaining a pointer to the internal data representation and a call command for calling the converted user-defined function using the pointer.

6. The method according to claim 1, wherein the user-defined function includes a lambda expression.

7. The method according to claim 1, wherein the code portion is a code portion of a bytecode of the user program.

8. The method according to claim 1, wherein the code portion is a code portion of a source code of the user program.

9. A non-transitory computer readable storage medium collectively storing program instructions that are executable by a computer to cause the computer to perform operations comprising:
    identifying a code portion that accesses a primitive value in a user-defined function included in a user program by referencing data structures designated in the user-defined function, the user-defined function including an array as an argument;
    converting the code portion and the argument to directly reference an internal data representation; and
    generating a code for calling the user-defined function converted by the conversion, the code including a pointer indicating an address of a memory region directly accessing the primitive value where each element of the array is lined up in association with an object managing the internal data representation.

10. The non-transitory computer readable storage medium according to claim 9, wherein converting includes:
    replacing the code portion with a code sequence for accessing data from the internal data representation; and replacing the argument with a pointer to the internal data representation.

11. The non-transitory computer readable storage medium according to claim 10, wherein:
the user program includes the user-defined function that receives the argument in a method call of the object; and
identifying includes identifying the code portion in the user-defined function included in the method call of the object.

12. The non-transitory computer readable storage medium according to claim 11, wherein the object is included in an in-memory computation framework.

13. The non-transitory computer readable storage medium according to claim 9, wherein generating includes generating a call command for obtaining a pointer to the internal data representation and a call command for calling the converted user-defined function using the pointer.

14. The non-transitory computer readable storage medium according to claim 9, wherein the user-defined function includes a lambda expression.

15. The non-transitory computer readable storage medium according to claim 9, wherein the code portion is a code portion of a bytecode of the user program.

16. The non-transitory computer readable storage medium according to claim 9, wherein the code portion is a code portion of a source code of the user program.

17. A computer comprising:
a computer readable storage medium collectively storing program instructions; and
a processor in communication with the computer readable storage medium, the processor being configured to execute the program instructions causing the processor to:
identify a code portion that accesses a primitive value in a user-defined function included in a user program by referencing data structures designated in the user-defined function, the user-defined function including an array as an argument;
convert the code portion and the argument to directly reference an internal data representation by replacing the code portion with a code sequence for accessing data from the internal data representation, and replacing the argument with a pointer to the internal data representation; and
generate a code for calling the user-defined function converted by the conversion, the code including a pointer indicating an address of a memory region directly accessing the primitive value where each element of the array is lined up in association with an object managing the internal data representation.

* * * * *